United States Patent
Lee et al.

(10) Patent No.: US 7,301,859 B2
(45) Date of Patent: Nov. 27, 2007

(54) TRACK ERROR DETECTION DEVICE HAVING A FUNCTION OF REMOVING A PHASE OFFSET, AND PHASE OFFSET REMOVING METHOD THEREOF

(75) Inventors: Jung-eun Lee, Seoul (KR); Jeong-won Lee, Sungnam (KR); Soo-jung Chang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 10/738,098

(22) Filed: Dec. 18, 2003

(65) Prior Publication Data
US 2004/0136278 A1    Jul. 15, 2004

(30) Foreign Application Priority Data
Jan. 13, 2003   (KR) .................... 10-2003-0002217

(51) Int. Cl.
*G11B 7/095*    (2006.01)

(52) U.S. Cl. .............................. 369/44.25; 369/44.35; 369/44.41

(58) Field of Classification Search ..................... None
See application file for complete search history.

(56) References Cited

U.S. PATENT DOCUMENTS 6,028,826 A * 2/2000 Yamamoto et al. ...... 369/44.35
2002/0094024 A1 * 7/2002 Ma et al. ..................... 375/226

FOREIGN PATENT DOCUMENTS

| JP | 60-43917 A | 3/1985 |
| JP | 10-97725 A | 4/1998 |
| JP | 11-110766 A | 4/1999 |

* cited by examiner

*Primary Examiner*—Tan Xuan Dinh
*Assistant Examiner*—Joseph Haley
(74) *Attorney, Agent, or Firm*—Sughrue Mion Pllc.

(57) ABSTRACT

A track error detection device that removes a phase offset and a phase offset removing method thereof removes an error signal generated by device circuit errors. The device includes an equalizing unit for equalizing the inputted signals A, B, C and D at a level, a comparison unit for quantizing the equalized signals A, B, C and D, and a phase shifting unit for removing phase offsets among the quantized signals A, B, C and D, based on control signals. A system control unit provides the control signals to the phase shifting unit. The track error detection device can remove all types of phase offsets which occur in the track error detection device. The accuracy and reliability of the detected track error signal is thus improved. By adjusting the phases of the quantized signals in the process of removing the phase offsets, power consumption and size of hardware is reduced.

15 Claims, 15 Drawing Sheets

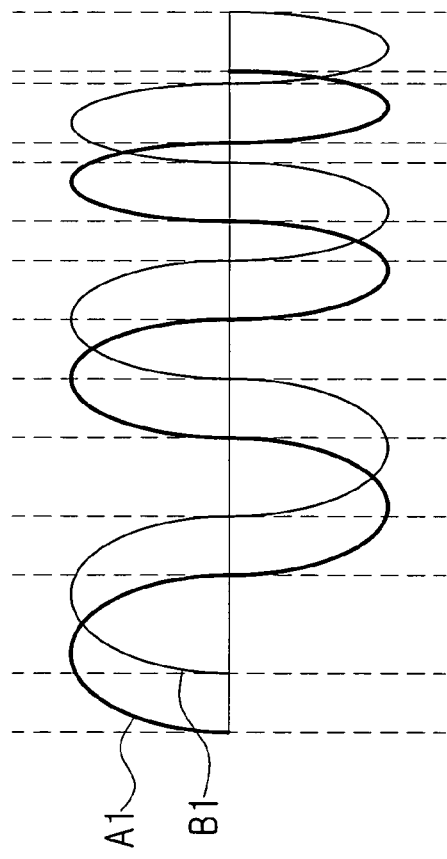
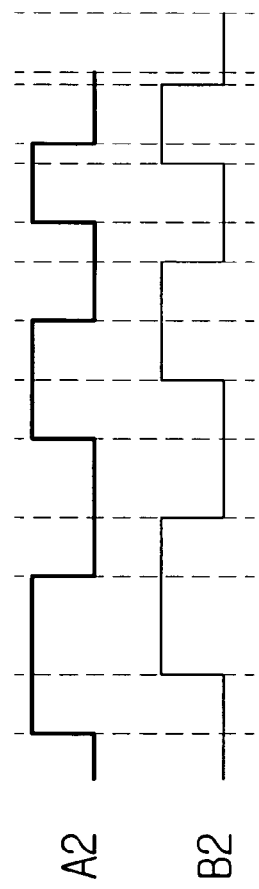
FIG. 7A
FIG. 7B

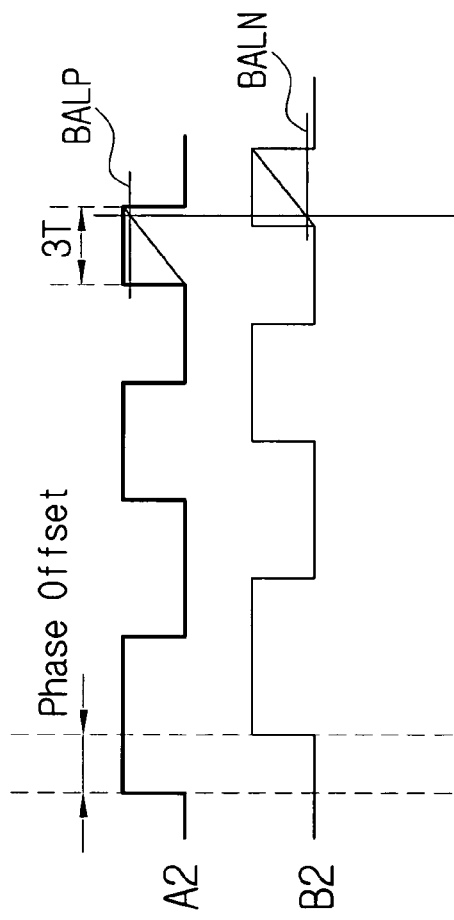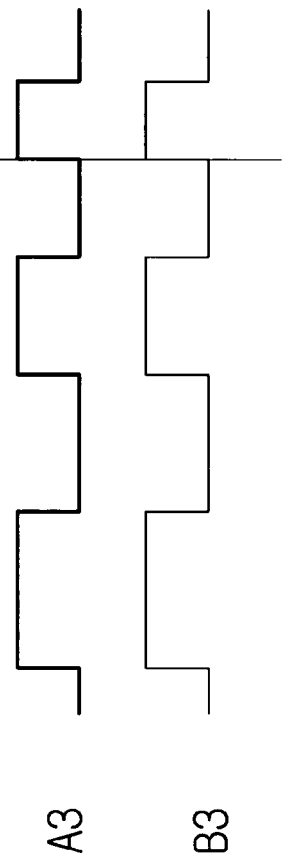

TRACK ERROR DETECTION DEVICE HAVING A FUNCTION OF REMOVING A PHASE OFFSET, AND PHASE OFFSET REMOVING METHOD THEREOF

BACKGROUND OF THE INVENTION

This application claims the priority of Korean Patent Application No. 2003-2217, filed on Jan. 13, 2003, in the Korean Intellectual Property Office, the disclosure of which is incorporated herein in its entirety by reference.

1. Field of the Invention

The present invention relates to a track error detection device that generates a track error signal by a DPD (Differential Phase Detector) method, and more particularly, to a track error detection device that removes a phase offset, and a phase offset removing method thereof which can remove an error signal generated due to circuit errors of the device itself.

2. Description of the Related Art

FIG. 1 illustrates a related art optical pickup device. A laser beam outputted from a light source 1 for recording/reproducing an information signal is reflected by a beam splitter 5, and incident to an object lens 7. The laser beam incident to the object lens 7 forms a light spot on a recording surface of a disc 10. The laser beam reflected from the recording surface of the disc 10 is incident to the object lens 7, and is then received in a light receiving element 3 after permeating through the beam splitter 5.

The light receiving element 3 divides the light spot into parts A, B, C and D, and measures the quantity of light. The quantities of light for the parts A, B, C and D of the light receiving element 3 are detected, and a track error signal is detected based on the detected quantities of light for the parts A, B, C and D.

Meanwhile, the laser beam outputted from the light source 1 is incident to a FPD (Front Pickup Device) 9 after permeating through the beam splitter 5. The FPD 9 detects the power of the inputted laser beam, and controls the light source 1 so as to keep the power of the inputted laser beam constant.

FIGS. 2A and 2B illustrate track error signal generation according to the related art DPD method. FIG. 2A shows an example that an image of a pit recorded on the disc 10 is received in the parts A, B, C and D of the light receiving element 3 of the FDP 9. In FIG. 2A, (a2) shows a state that the image of the pit accurately matches the center of the light receiving element 3, and (a1) and (a3) show states that the image of the pit leans to the left and right, respectively, with respect to the center of the light receiving element 3.

FIG. 2B is a waveform diagram explaining the phase offsets of signals as opposed to the quantities of light received in the parts A and B, in which (a1'), (a2') and (a3') show the phase offsets corresponding to the those of (a1), (a2) and (a3) of FIG. 2A. Consequently, the DPD method is a method of detecting a track error signal using the phase offsets caused by the quantities of light.

The track error (TE) signal can be expressed by the following equation.

$$TE = k(\Delta\Phi_{AB} + \Delta\Phi_{CD}) \qquad \text{Equation 1}$$

Here, $\Delta\Phi_{AB}$ is the phase offset between A and B, and $\Delta\Phi_{CD}$ is the phase offset between C and D.

FIG. 3 is a block diagram of a related art track error detection device 20 for detecting a track error (TE) signal, and FIGS. 4A to 4E are waveform diagrams of input/output signals of respective constituent elements of the track error detection device of FIG. 3. Hereinafter, a related art process of detecting a track error (TE) signal with reference to the waveforms of the signals corresponding to the quantities of light received in the parts A and B of the light receiving element 3 of the optical pickup device 10 will be explained.

The track error detection device 20 includes equalizers 11, comparators 13, phase detectors 15, adders 17 and a subtracter/low pass filter (SUB/LPF) 19. The equalizers 11 equalize signals A and B, which correspond to the quantities of light received in the parts A and B of the light receiving element 3 of the optical pickup device 10, and output equalized signals A1 and B1 as shown in FIG. 4A.

The comparators 13 quantize the equalized signals A1 and B1 as shown in FIG. 4A, and output signals A2 and B2 of a digital form as shown in FIG. 4B. Then, the phase detectors (PD) 15, as expressed by the equation 1, detect the phase offsets between the parts A and B and between the parts C and D of the light receiving element 3 to detect the track error (TE) signal. That is, the PDs 15 detect the phase offsets with respect to the output signals A2 and B2 of the comparators 13 as shown in FIG. 4B, and output an up signal $AB_U$ and a down signal $AB_D$ corresponding to the phase offsets as shown in FIG. 4C.

One of the adders 17 adds the up signal $AB_U$, which is the phase offset signal between the signals A2 and B2, to the up signal $CD_U$, which is the phase offset signal between the signals C2 and D2. The other of the adders 17 adds the down signal $AB_D$, which is the phase offset signal between the signals A2 and B2, to the down signal $CD_D$, which is the phase offset signal between the signals C2 and D2. The signals added by the adders 17 are as shown in FIG. 4D, and the SUB/LPF 19 subtracts and low-pass-filters the added signals, and outputs a track error (TE) signal as shown in FIG. 4E.

However, the foregoing related art has various problems and disadvantages. According to the related art track error detection device as described above, however, the phase offsets among the signals A, B, C and D, which correspond to the quantities of light received in the parts A, B, C and D of the light receiving element 3, may occur due to the circuit errors such as optical aberration, non-ideal pit structure, lens shift, channel mismatch.

FIG. 5 is a view illustrating diverse types of phase offsets. In FIG. 5, (a) shows an ideal case that no phase offset occurs, (b) shows a case that the phase offset occurs between the parts A and D (or B and C), (c) shows a case that the phase offset occurs between the parts A and B (or C and D), and (d) shows a case that the phase offset occurs among the parts A, B, C and D.

According to the related art track error detection device as shown in FIG. 3, the phase offsets are detected with respect to the signals that correspond to the quantities of light received in the parts A and B and in the parts C and D, and the detected phase offsets are added together. Accordingly, the phase offset which occurs between the parts A and D (or B and C) due to the circuit error as shown as (b) in FIG. 5 does not cause any problem, but the phase offset which occurs as shown as (c) and (d) in FIG. 5 cannot be removed.

However, this related art has various problems and disadvantages. Consequently, the related art track error detection device cannot remove diverse types of phase offsets occurring due to the circuit errors, and thus it cannot detect the accurate track error (TE) signal.

SUMMARY OF THE INVENTION

An object of the invention is to solve at least the above-identified problems and/or disadvantages and to provide at least the advantages described hereinafter.

Another object of the present invention is to provide a track error detection device and a phase offset removing method thereof capable of detecting an accurate track error signal by removing phase offsets that occur due to circuit errors of the track error detection device.

To achieve the above aspects and/or other features of the present invention, there is provided a track error detection device. The device includes an element for receiving light reflected from a data recording surface of a recording medium, a divided light spot received in the element in tangential and radial directions, and a track error signal detected using signals A, B, C and D that correspond to quantities of light received in respective divided parts. More specifically, the device comprises an equalizing unit equalizing the inputted signals A, B, C and D to a level, a comparison unit quantizing the equalized signals A, B, C and D, and a phase shifting unit removing phase offsets among the quantized signals A, B, C and D, in accordance with control signals.

Preferably, the track error detection device further comprises a system control unit that generates and outputs the control signals for removing the phase offsets among the quantized signals A, B, C and D to the phase shifting unit.

The control signals comprise a first control signal for shifting phases of the quantized signals A and C, and a second control signal for shifting phases of the quantized signals B and D to the phase shifting unit, wherein the phase shifting unit removes the phase offset between the quantized signals A and B and the phase offset between the quantized signals C and D based on the first and second control signals.

The phase shifting unit includes a first phase shifter shifting the phase of the quantized signal A in accordance with the first control signal, a second phase shifter shifting the phase of the quantized signal B in accordance with the second control signal, a third phase shifter shifting the phase of the quantized signal C in accordance with the first control signal, and a fourth phase shifter shifting the phase of the quantized signal D in accordance with the second control signal.

Preferably, the first to fourth phase shifters are VCPS (Voltage Controlled Phase Shifter) circuits that shift the phases in accordance with control voltages The VCPS circuit includes a first pulse generation unit for comparing a pulse corresponding to an input signal with the control voltage, and selecting a range of the pulse corresponding to the input signal, a second pulse generation unit for comparing a pulse corresponding to an inverted input signal with the control voltage, and selecting a range of the pulse corresponding to the inverted input signal, and a flip-flop for receiving output signals of each of the first and second pulse generation units as a reset signal and a set signal, respectively.

The first pulse generation unit includes a first NMOS transistor, the gate of which receives the input signal, the source of which is grounded, and the drain of which forms a first output terminal, a first capacitor coupled between the first output terminal and the source of the first NMOS transistor, a first current control unit controlling a current supplied to the first capacitor coupled to the first output terminal of the first NMOS transistor, and a first comparison unit comparing a voltage charged in the first capacitor with the control voltage, and selecting the specified range of the pulse corresponding to the charged voltage.

The second pulse generation unit includes a second NMOS transistor, the gate of which receives the input signal, the source of which is grounded, and the drain of which forms a second output terminal, a second capacitor coupled between the second output terminal and the source of the second NMOS transistor, a second current control unit for controlling a current supplied to the second capacitor coupled to the second output terminal of the second NMOS transistor, and a second comparison unit for comparing a voltage charged in the second capacitor with the control voltage, and selecting the specified range of the pulse corresponding to the charged voltage.

More preferably, the first current control unit and the second current control unit control the current supplied to the respective first capacitor and the second capacitor so that the first and second capacitors have a constant drop rate for charging from a ground voltage level to a power supply voltage level.

In another aspect of the present invention, there is provided a phase offset removing method for a track error detection device having an element for receiving light reflected from a data recording surface of a recording medium, a divided light spot that is received in the light receiving element in tangential and radial directions, and a track error signal that is detected via signals A, B, C and D that correspond to quantities of light received in respective divided parts. The method comprises equalizing the inputted signals A, B, C and D to a level, quantizing the equalized signals A, B, C and D, and adjusting phases of the quantized signals A, B, C and D based on control signals, to remove phase offsets among the quantized signals A, B, C and D.

Preferably, the phase offset removing method further comprises a control step of providing the control signals for removing the phase offsets among the quantized signals A, B, C and D. The control step provides a first control signal for shifting phases of the quantized signals A and C, and a second control signal for shifting phases of the quantized signals B and D, to the phase offset removing step, wherein the phase offset removing step removes the phase offset between the quantized signals A and B, and the phase offset between the quantized signals C and D, based on the first control signal and the second control signal.

The phase offset removing step is performed by a first phase shifter for shifting the phase of the quantized signal A in accordance with the first control signal, a second phase shifter for shifting the phase of the quantized signal B in accordance with the second control signal, a third phase shifter for shifting the phase of the quantized signal C in accordance with the first control signal, and a fourth phase shifter for shifting the phase of the quantized signal D in accordance with the second control signal.

Additionally, the foregoing steps may be performed as instructions in a computer readable medium.

Accordingly, all types of phase offsets that may occur in the track error detection device can be removed, and thus the accuracy and reliability of the detected track error signal can be improved.

Also, by adjusting the phases of digital type signals quantized through equalizers and comparators in the process of removing the phase offsets, the power consumption of the system can be reduced and the size of hardware can be reduced.

BRIEF DESCRIPTION OF THE DRAWINGS

The above objects and other advantages of the present invention will become more apparent by describing in detail the preferred embodiments thereof with reference to the attached drawings in which:

FIGS. 7A to 7D are waveform diagrams of input/output signals of constituent elements of the device of the exemplary, non-limiting embodiment of the present invention illustrated in FIG. 6;

DETAILED DESCRIPTION OF THE PREFERRED EMBODIMENTS

Figure 1:
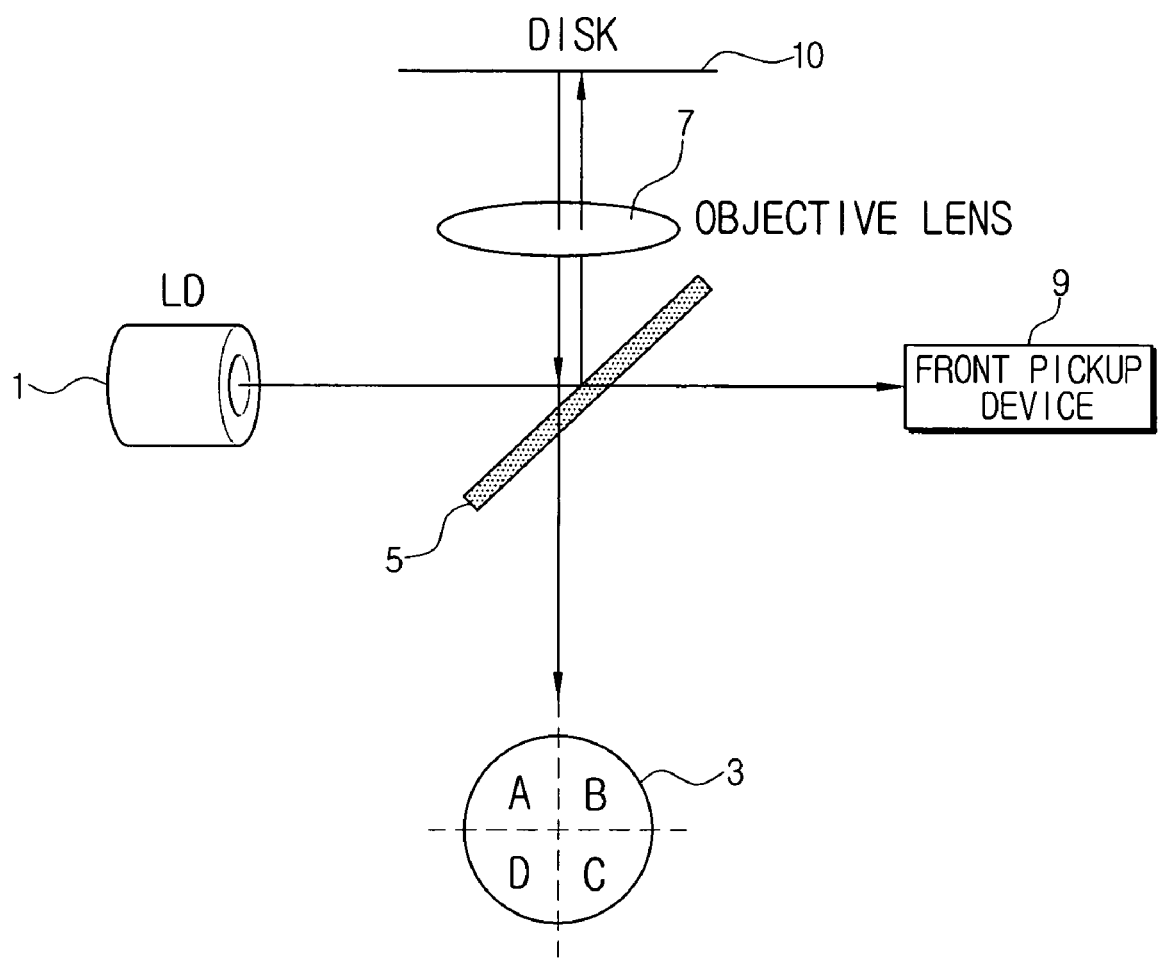
FIG. 1 is a schematic view illustrating a related art optical pickup device.
Figure 2A:
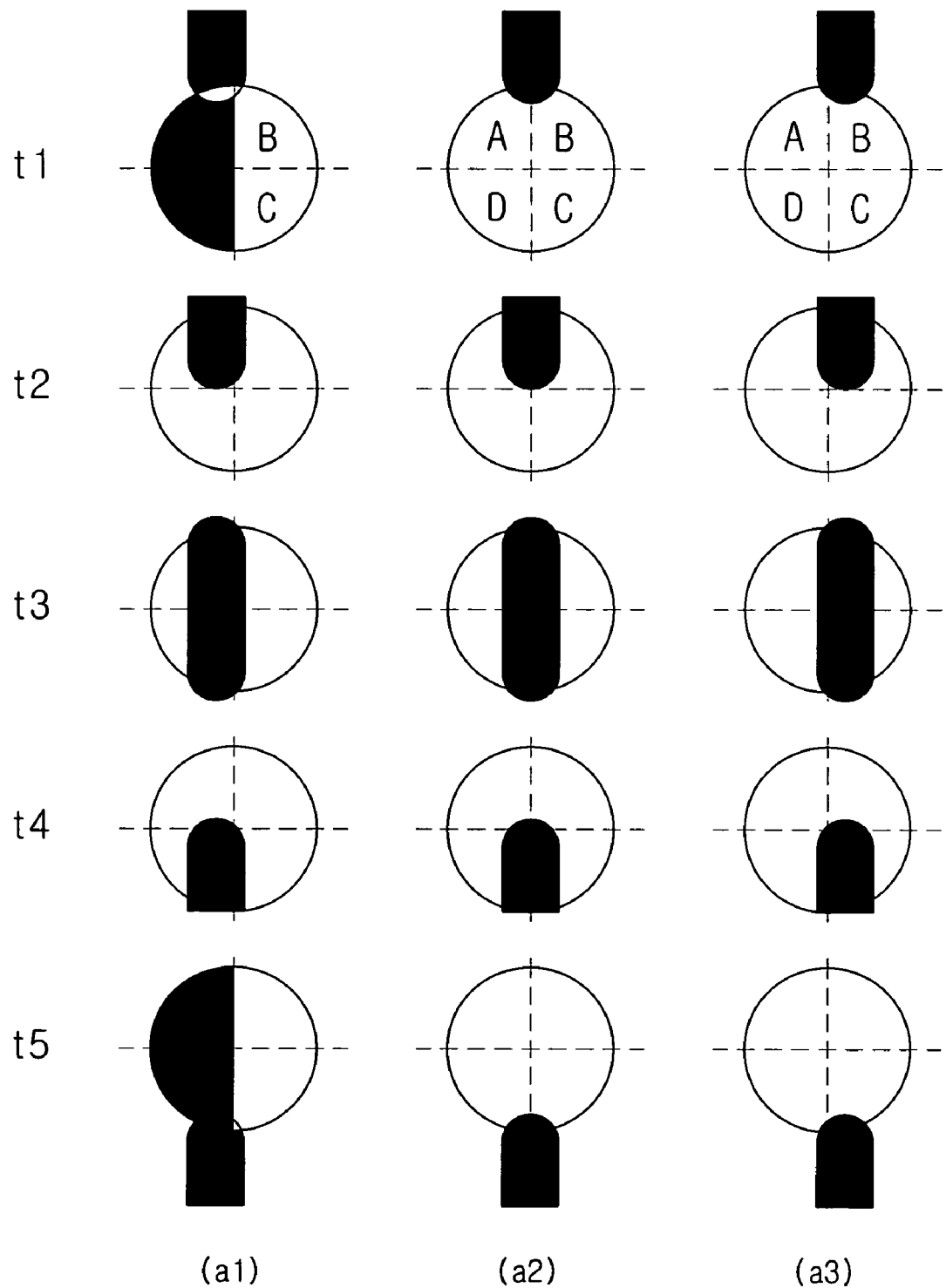
FIGS. 2A and 2B are views explaining the concept of track error signal generation according to the related art DPD method.
Figure 2B:
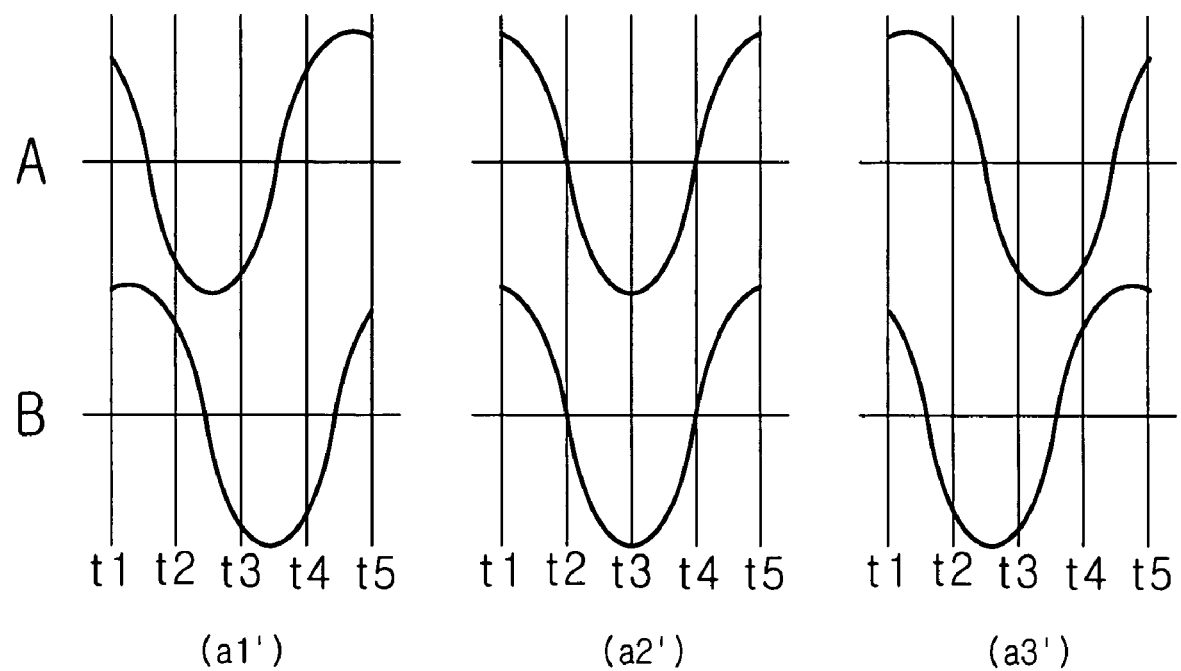
Figure 3:
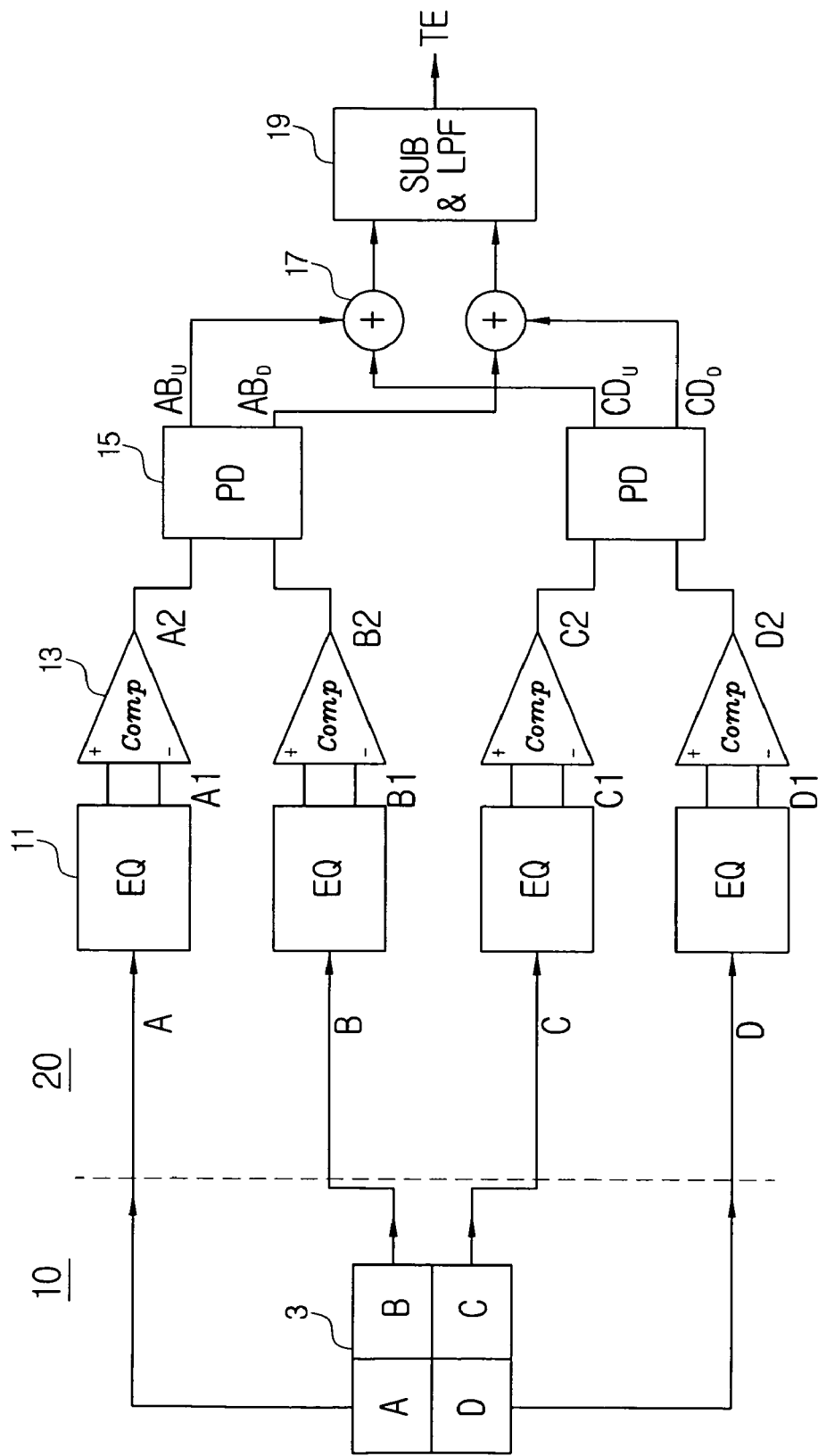
FIG. 3 is a block diagram of a related art track error detection device.
Figure 4A:
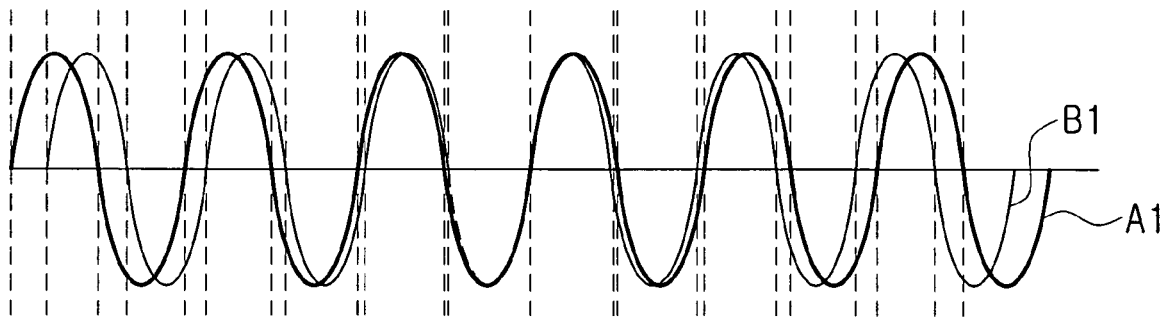
FIGS. 4A to 4E are waveform diagrams of input/output signals of constituent elements of the related art device of FIG. 3.
Figure 4B:
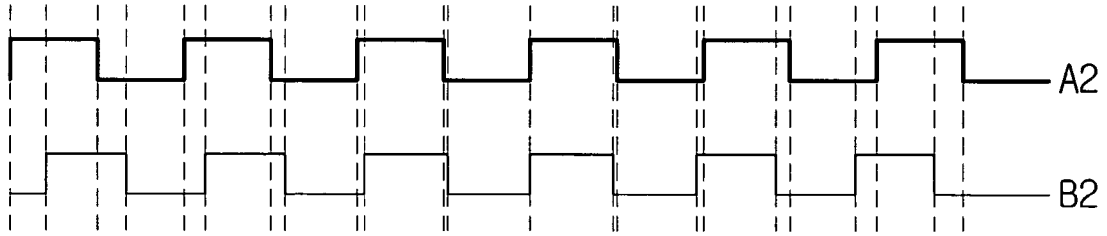
Figure 4C:
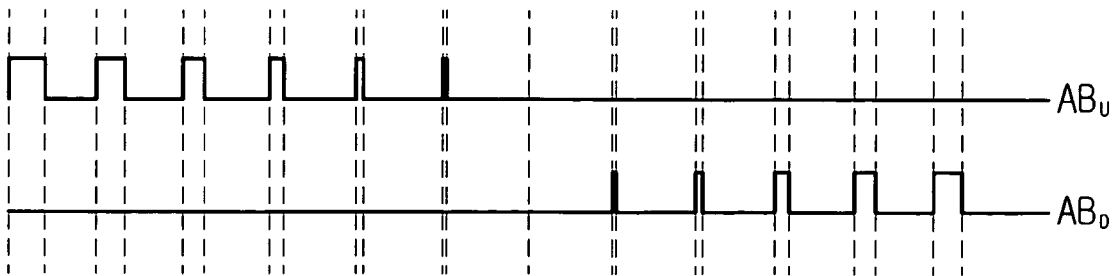
Figure 4D:
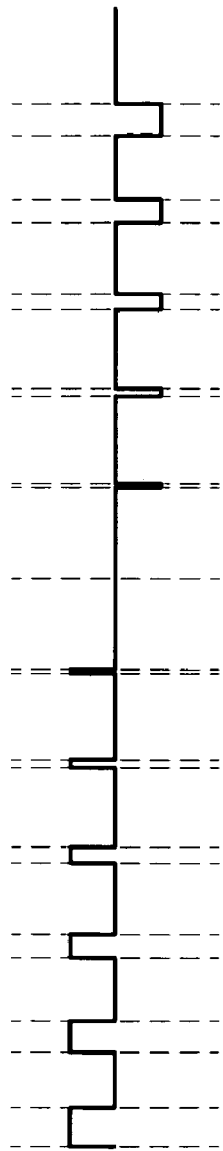
Figure 4E:
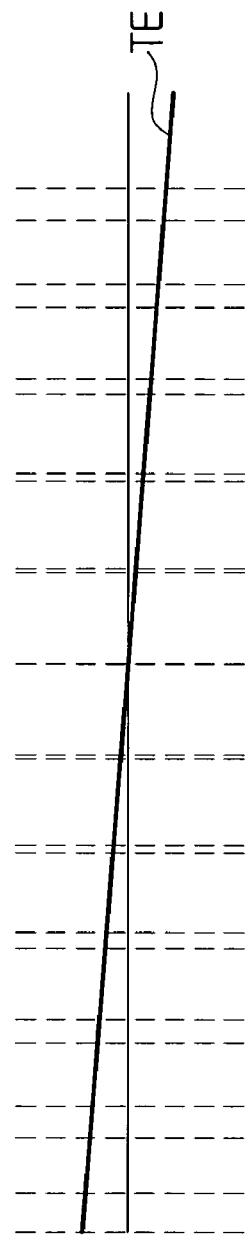
Figure 5:
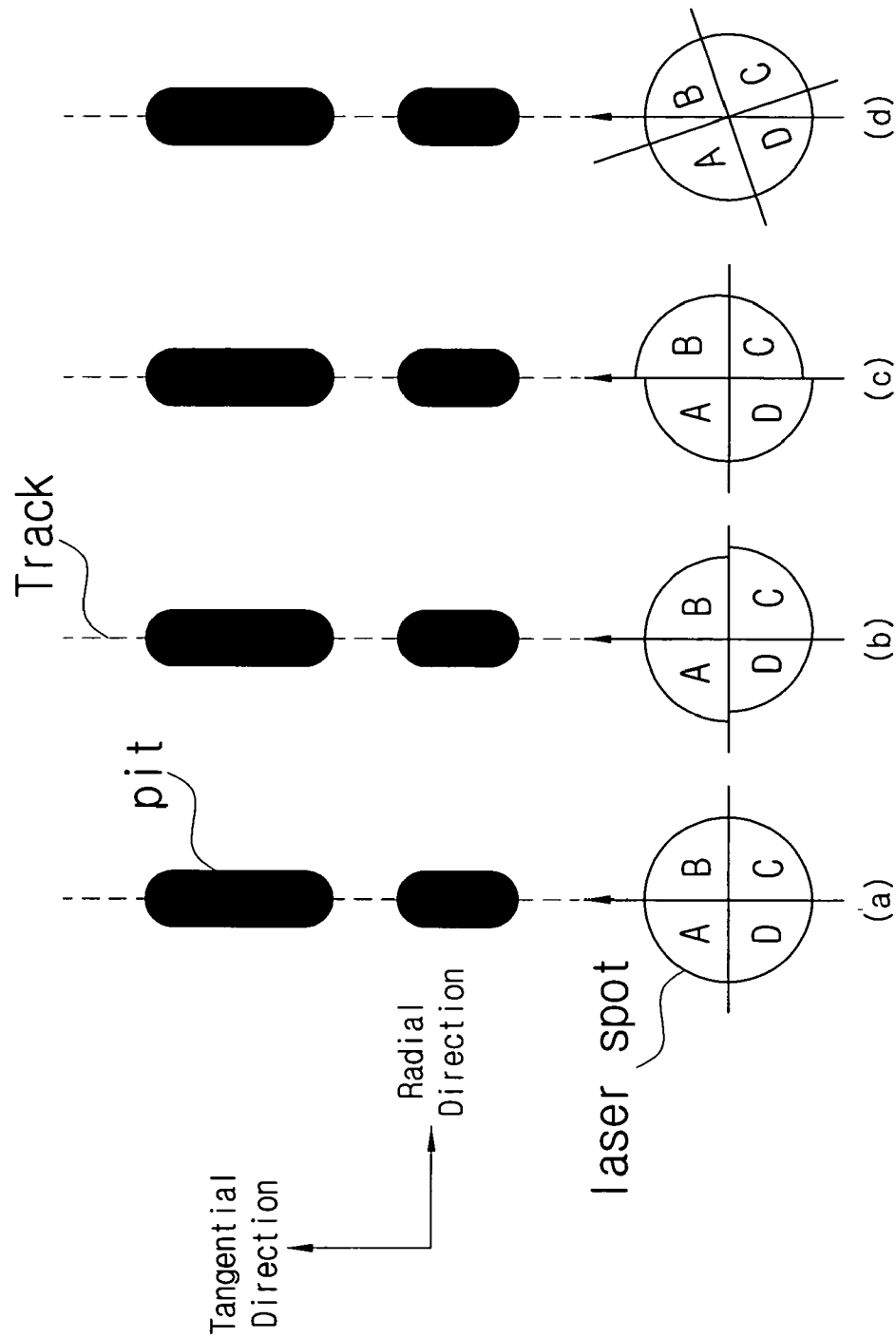
FIG. 5 is a view illustrating diverse types of related art phase offsets.

A track error detection device and a phase offset removing method thereof according to preferred embodiments of the present invention will be described in detail with reference to the annexed drawings in which like reference numerals refer to like elements.

Figure 6:
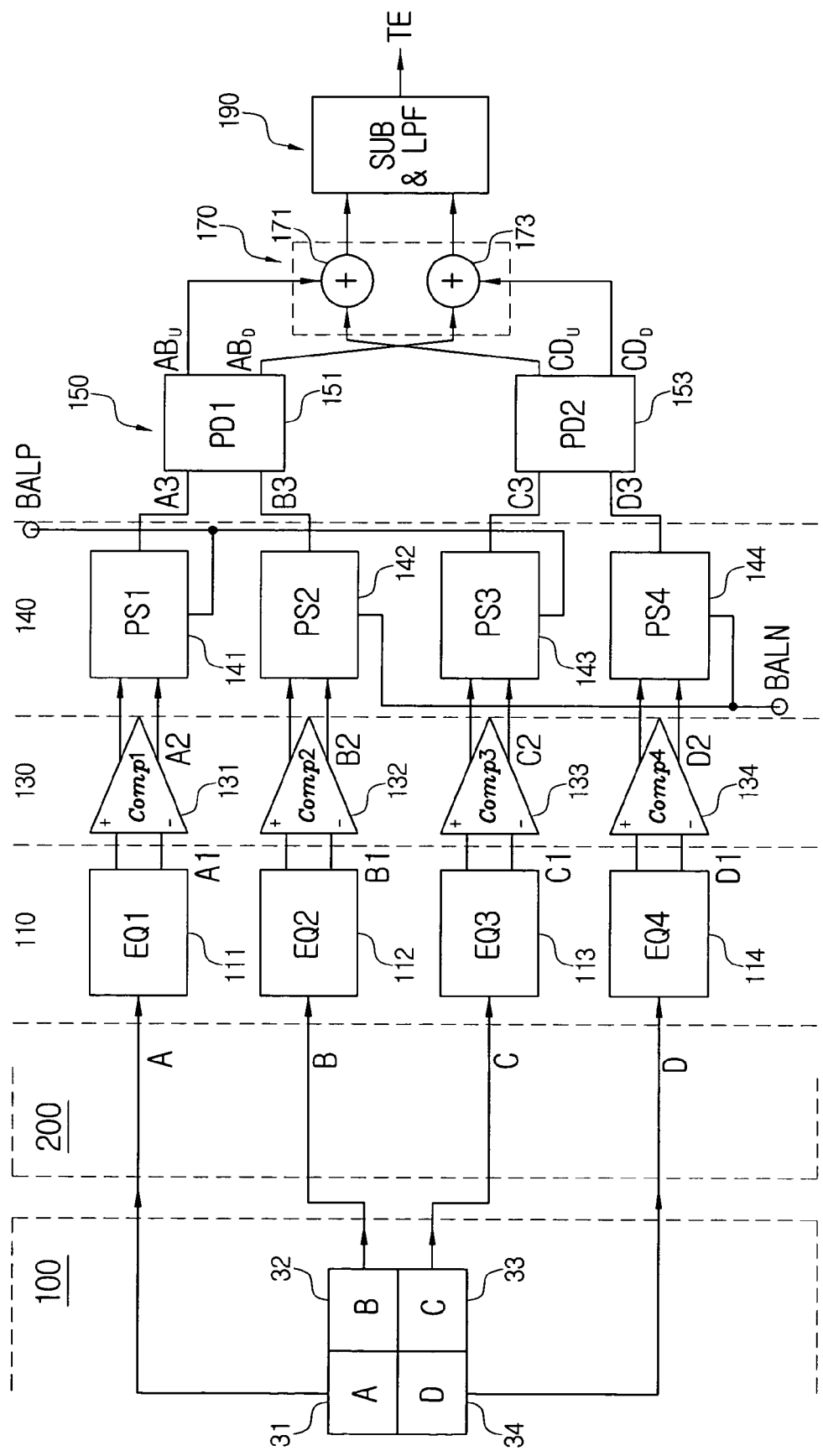
FIG. 6 is a block diagram of a track error detection device according to an exemplary, non-limiting embodiment of the present invention.
Figure 8:
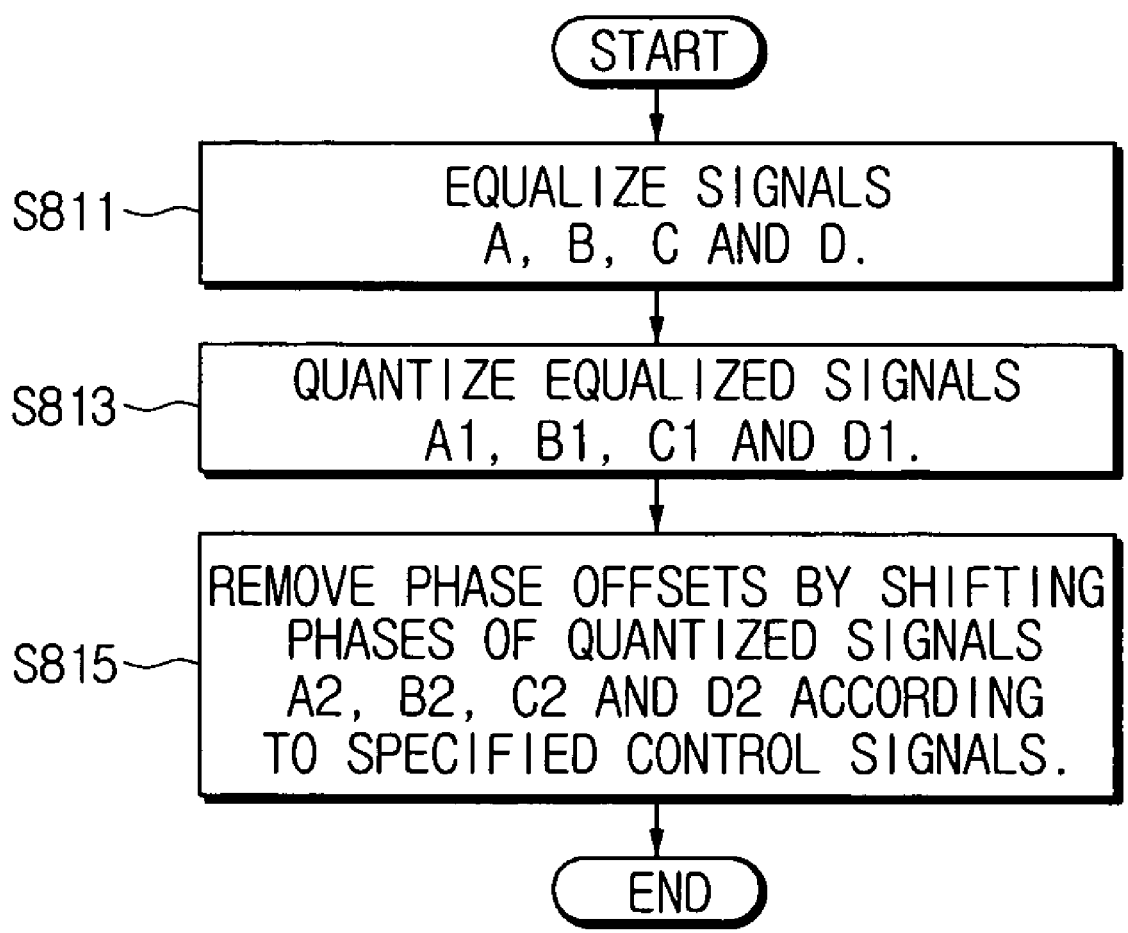
FIG. 8 is a flowchart illustrating an exemplary, non-limiting embodiment a phase offset removing method for a track error detection device of the exemplary, non-limiting embodiment of the present invention illustrated in FIG. 6.

FIG. 6 is a block diagram of a track error detection device capable of removing phase offsets occurring due to circuit errors according to the present invention.

The reference numeral '100' denotes an optical pickup device, and '30' denotes a light receiving element included in the optical pickup device 100. A track error detection device 200 detects a track error (TE) signal based on quantities of light received in divided parts A, B, C and D of the light receiving element 30 of the optical pickup device 100.

Signals corresponding to the quantities of light received in the A, B, C and D (parts 31 to 34 of the light receiving element 30) are input to the track error detection device 200.

The track error detection device 200 includes an equalizing (EQ) unit 110, a comparison (comp) unit 130, a phase shifting unit 140, a phase detection (PD) unit 150, an adding unit 170 and a subtracter/low pass filter (SUB/LPF) 190.

The equalizing unit 110 is a block for equalizing inputted signals at a predetermined level, and includes equalizers (EQ1 to EQ4) 111 to 114 for equalizing the signals A, B, C and D corresponding to the quantities of light received in the A, B, C and D at corresponding parts 31 to 34 of the light receiving element 30.

The comparison unit 130 includes comparators (comp1 to comp4) 131 to 134 for quantizing equalized signals A1, B1, C1 and D1 to digital type signals A2, B2, C2 and D2.

The phase shifting (PS) unit 140 includes phase shifters (PS1 to PS4) 141 to 144 for removing the phase offsets among the quantized signals A2, B2, C2 and D2 in accordance with the specified control signals.

The phase detection unit 150 includes a phase detector (PD1) 151 for detecting the phase offset between signals A3 and B3, and a phase detector (PD2) 153 for detecting the phase offset between signals C3 and D3, which are signals phase-shifted by the phase shifting unit 140 in accordance with the specified control signals.

The adding unit 170 includes an adder 171 for adding up signals $AB_U$ and CDu outputted from the phase shifters (PD1 and PD2) 151 and 153, and an adder 173 for adding down signals $AB_D$ and $CD_D$ outputted from the phase shifters.

The subtracter/low pass filter 190 outputs a track error (TE) signal by subtracting and low-pass-filtering signals outputted from the adding unit 170.

Hereinafter, the phase offset removing method for the track error detection device 200 according to the present invention will be explained with reference to FIGS. 7A to 7C and FIG. 8.

FIGS. 7A to 7C are waveform diagrams of input/output signals of constituent elements of the track error detection device 200. The equalizers 111 and 112 equalize the signals A and B according to the quantities of light received in the A and B parts 31 and 32 of the light receiving element 30, and output the equalized signals A1 and B1 having a constant signal level as shown in FIG. 7A (step S811).

Then, the comparators 131 and 132 quantize the analog signals A1 and B1 outputted from the equalizers 111 and 112, and output the digital signals A2 and B2 as shown in FIG. 7B (step S813).

At step S815, the phase shifting unit 140 removes the phase offsets between the signals A2 and B2 and between the signals C2 and D2 based on a control voltage BAL provided from a system control unit (not illustrated). Here, the control voltage BAL has symmetric voltage levels BALP and BALN centering around $V_{DD}/2$.

Specifically, the phase shifter 141 and the phase shifter 143 shift the phases of the signals A2 and C2, respectively, based on the control voltage BALP, and the phase shifter 142 and 144 shift the phases of the signals B2 and D2, respectively, based on the control voltage BALN, so that the phase offsets between the signals A2 and B2 and between the signals C2 and D2 are removed (step S815).

Accordingly, as shown in FIG. 7C, the phase offsets of the signals A2 and B2 are removed by the phase shifters 141 and 143 in accordance with the specified control voltages BALP and BALN, and the signals A3 and B3 are outputted as shown in FIG. 7D. The operation of the phase shifting unit 140 will be explained later.

The phase detectors (PD1 and PD2) 151 and 153 of the phase detection unit 150 detect the phase offsets between the phase-shifted signals A3 and B3 and between the phase-shifted signals C3 and D3, respectively.

Thereafter, the track error (TE) signal is outputted through the adding unit 170 and the SUB/LPF 190. That is, as the phase offsets between the signals A2 and B2 and between the signals C2 and D2 are removed by the phase shifting unit 140, the output signal of the phase detection unit 150 and the output signal of the SUB/LPF 190 become the center voltage VDD/2. This means that the track error signal that is the output signal of the track error detection device 200 becomes '0'.

The phase offset removing process as described above, is performed during the initiation of the disc placed in the optical recording/reproducing device, and at this time, the system control unit (not illustrated) monitors a sine wave having a constant amplitude due to the eccentricity according to the initial rotation of the disc, and adjusts the level of the control voltage signal BAL so that the intermediate value of the sine wave becomes $V_{DD}/2$. The time point that the intermediate value of the sine wave becomes $V_{DD}/2$ will be the time point that the phase offsets are removed as described above as shown in FIG. 7C, and the system control unit sets the level of the BAL signal at this time as the level of the BAL signal to be applied to the phase shifting unit 140.

As described above, since the phase offsets of the track error detection device 200 are removed through the initialization work, the track error detection device 200 can detect an accurate track error (TE) signal.

Figure 9:
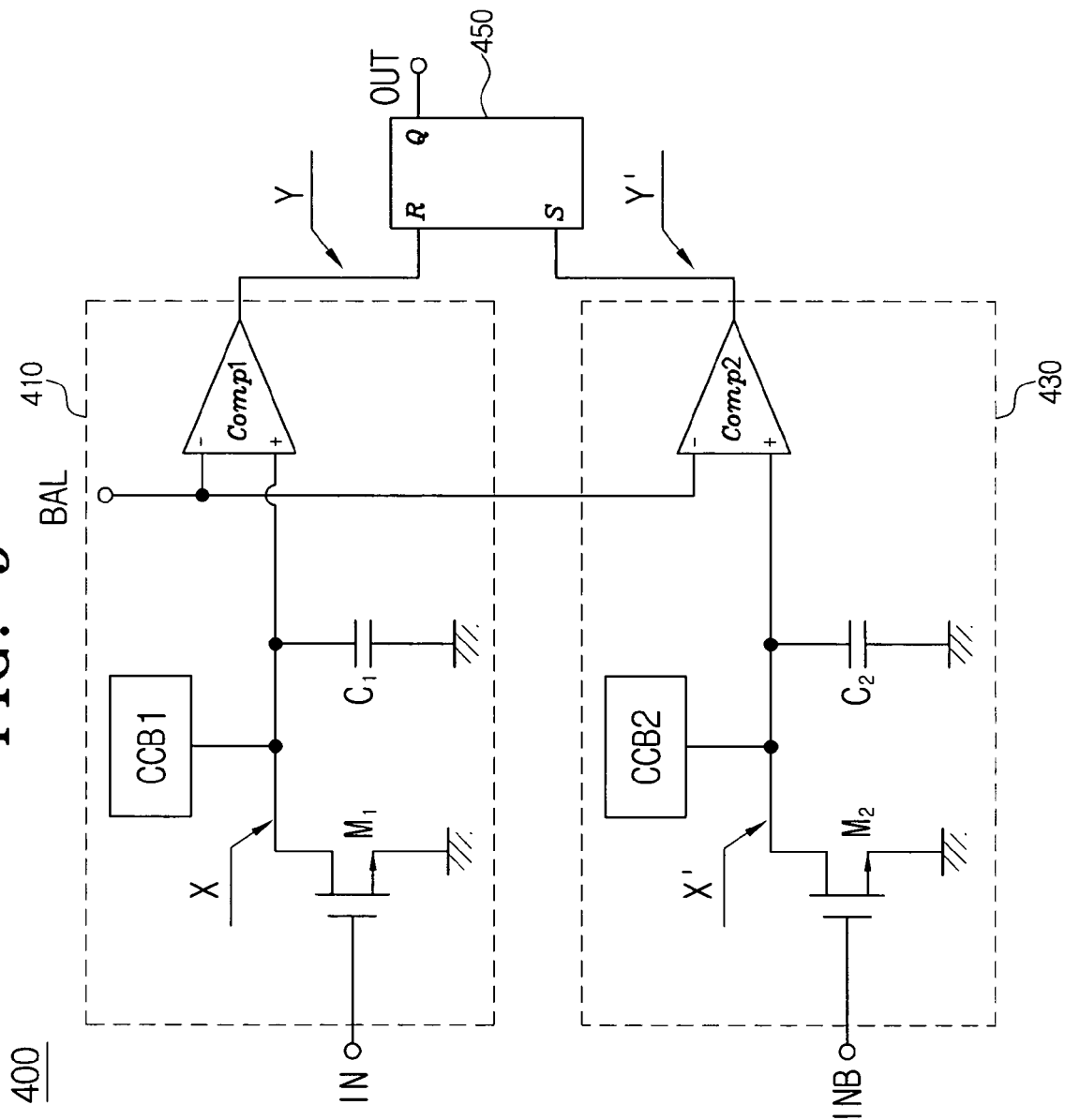
FIG. 9 is a circuit diagram of a VCPS (Voltage Controlled Phase Shifter) circuit as an example of the phase shifting unit 140 of the exemplary, non-limiting embodiment of the present invention FIG. 6.
Figure 10:
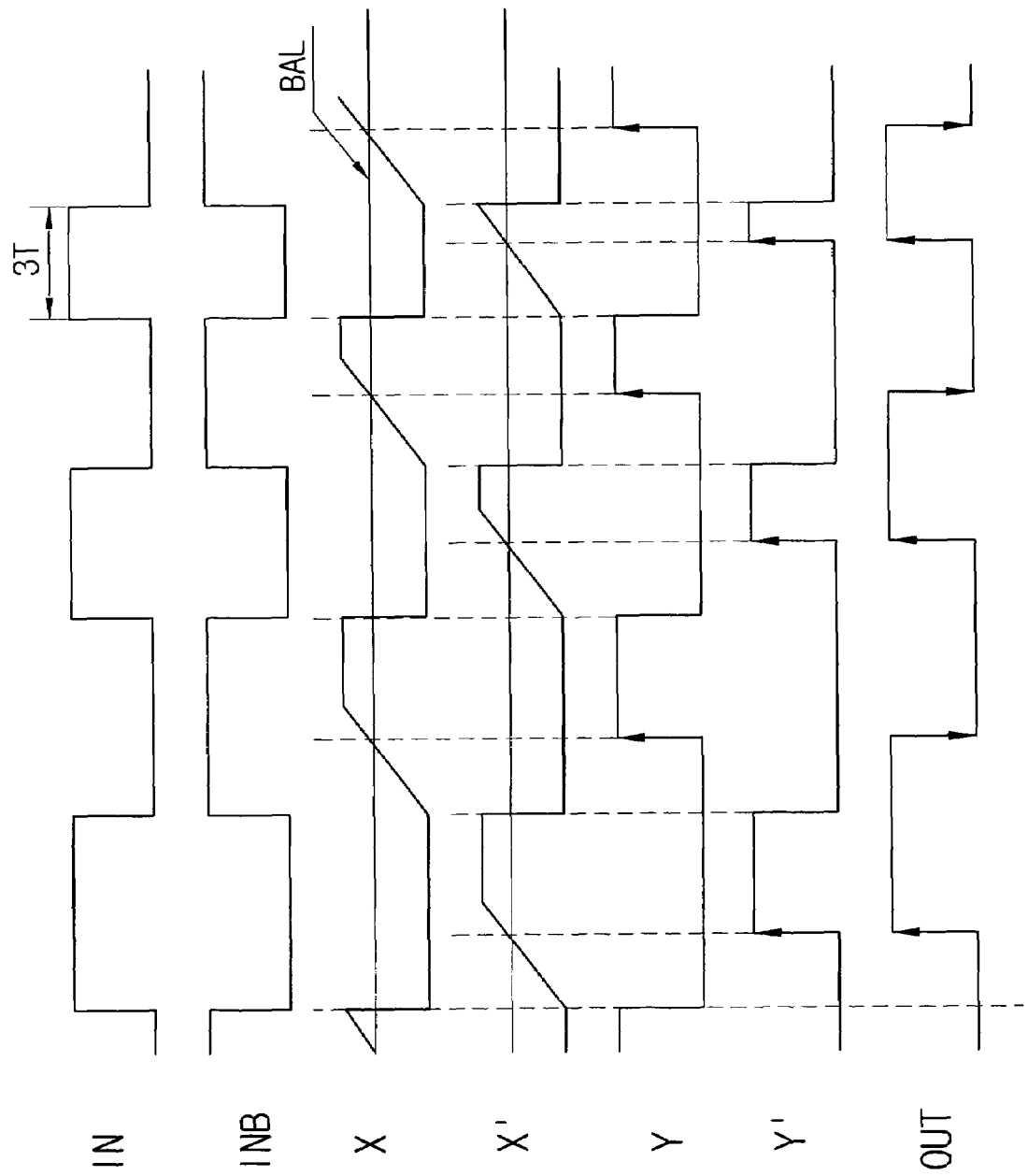
FIG. 10 is a waveform diagram explaining the operation of the VCPS circuit of the exemplary, non-limiting embodiment of the present invention illustrated in FIG. 9.

The phase shifting operation performed in accordance with the control voltage BAL will be explained in detail, taking the VCPS (Voltage Controlled Phase Shifter) circuit of FIG. 9 as an example of the phase shifting unit 140 of FIG. 6. FIG. 10 illustrates waveforms appearing at various points in the circuit of FIG. 9.

The VCPS circuit 400 includes a first pulse generation unit 410, a second pulse generation unit 430, and an SR type flip-flop 450 which receives the output signals of the first and second pulse generation units 410 and 430 as its reset and set signals.

The first pulse generation unit 410 includes a first NMOS transistor M1, the gate of which receives the input signal, the source of which is grounded, and the drain of which forms a first output, terminal X. Also provided are a first capacitor $C_1$ connected between the first output terminal X and the source of the first NMOS transistor, a first current control unit CCB1 for controlling a current supplied to the first capacitor C, connected to the first output terminal X of the first NMOS transistor, and a first comparison unit Comp1 for comparing a voltage charged in the first capacitor $C_1$ with the control voltage BAL provided from the system control unit and selecting the specified range of the pulse corresponding to the charged voltage. The second pulse generation unit 430 has substantially the same construction as the first pulse generation unit 410.

The output signal of the comparison unit 130 of the track error detection device 200 of FIG. 6 is inputted to an input terminal IN of the VCPS circuit 400.

If a high signal is inputted to the input terminal IN, the first NMOS transistor $M_1$ is turned on, and the charge on the first output terminal X is discharged for a short time. At this time, in order for the charge on the first output terminal X to be rapidly discharged to the ground voltage, the amount of charge being discharged from the first NMOS transistor $M_1$ to the ground voltage should be much greater than the amount of source current of the first current control unit CCB1. This means that the impedance of the first current control unit CCB1 should be greater than that of the first NMOS transistor $M_1$ from the viewpoint of the first output terminal X.

Meanwhile, if a low signal is inputted to the input terminal IN, the first NMOS transistor $M_1$ is turned off, and the first output terminal X is charged with a predetermined drop rate (DR). At this time, the drop rate (DR) may be expressed by the following equation.

$$DR = \Delta V/\Delta T = I_{CCB}/C_1 [mV/\mu sec]$$  Equation 2

Here, the drop rate (DR) is set so that the charge from the ground voltage to the power supply voltage is performed, for example, for a 3T (T: a system channel clock period) period which corresponds to the minimum length of the pit recorded in the disc. Accordingly, the voltage waveform appearing on the first output terminal X is illustrated in FIG. 10.

The comparator Comp1 of the first pulse generation unit 410 outputs a high level signal if the voltage inputted from the first output terminal X is larger than the control voltage BAL provided from the system control unit, and outputs a low level signal if the voltage from the first output terminal X is smaller than the control voltage BAL to select the specified range of the pulse corresponding to the voltage of the first output terminal X, as shown as output Y in FIG. 10.

Meanwhile, the second output terminal X' of the second NMOS transistor $M_2$ of the second pulse generation unit 430 has a waveform that is opposite to the waveform of the first output terminal X. Accordingly, the comparator Comp2 outputs a high level signal if the voltage inputted from the second output terminal X' is larger than the control voltage BAL, and outputs a low level signal if the voltage from the second output terminal X' is smaller than the control voltage BAL to select the specified range of the pulse corresponding to the voltage of the second output terminal X' as shown as Y' in FIG. 10.

The signals outputted from the first pulse generation unit 410 and the second pulse generation unit 430 are inputted to the reset terminal (R) and the set terminal (S) of the SR type flip-flop 450, respectively. In accordance with the operation characteristic of the SR type flip-flop 450, the output OUT of the SR type flip-flop becomes low when a high level signal is inputted to its reset terminal (R), and becomes high when a high level signal is inputted to its set terminal (S) as shown as OUT in FIG. 10.

Referring to the waveforms of FIG. 10, edges of the waveforms Y and Y' are changed in accordance with the level of the control voltage BAL inputted to the comparators Comp1 and Comp2. Accordingly, the output OUT of the SR type flip-flop is shifted to the left or right. Thus, by adjusting the level of the control voltage BAL, the system control unit can adjust the phase of the signal inputted to the VCPS circuit 400.

As described above, the phase shifting unit 140 having the VCPS circuit 400 removes the phase offset between the signals A2 and B2 by shifting the phases of the signals A2 and B2 in accordance with the inputted control voltages BALP and BALN as shown in FIGS. 7B and 7C. The phase offset between the signals C2 and D2 is also removed in the same manner.

Table 1 below shows the measurement condition of the DPD (Differential Phase Detector) implemented through a BiCOMOS 0.6 µm 2-poly 3-metal process.

TABLE 1

| A, C frequency [MHz] | B, D, Frequency [MHz] | InputAmplitude [mVpp] | PhasePeriod [KHz] |
|---|---|---|---|
| 4.4 | 4.39 | 100 | 10 |

A 4.4 KHz sine wave having an amplitude of 100 mVpp is applied to the inputs A and C of the DPD, and 4.39 KHz sine wave having an amplitude of 100 mVpp is applied to the inputs B and D of the DPD. Accordingly, the DPD outputs a sawtooth wave having a phase period of 10 KHz as shown in FIGS. 11A and 11B.

Figure 11A:
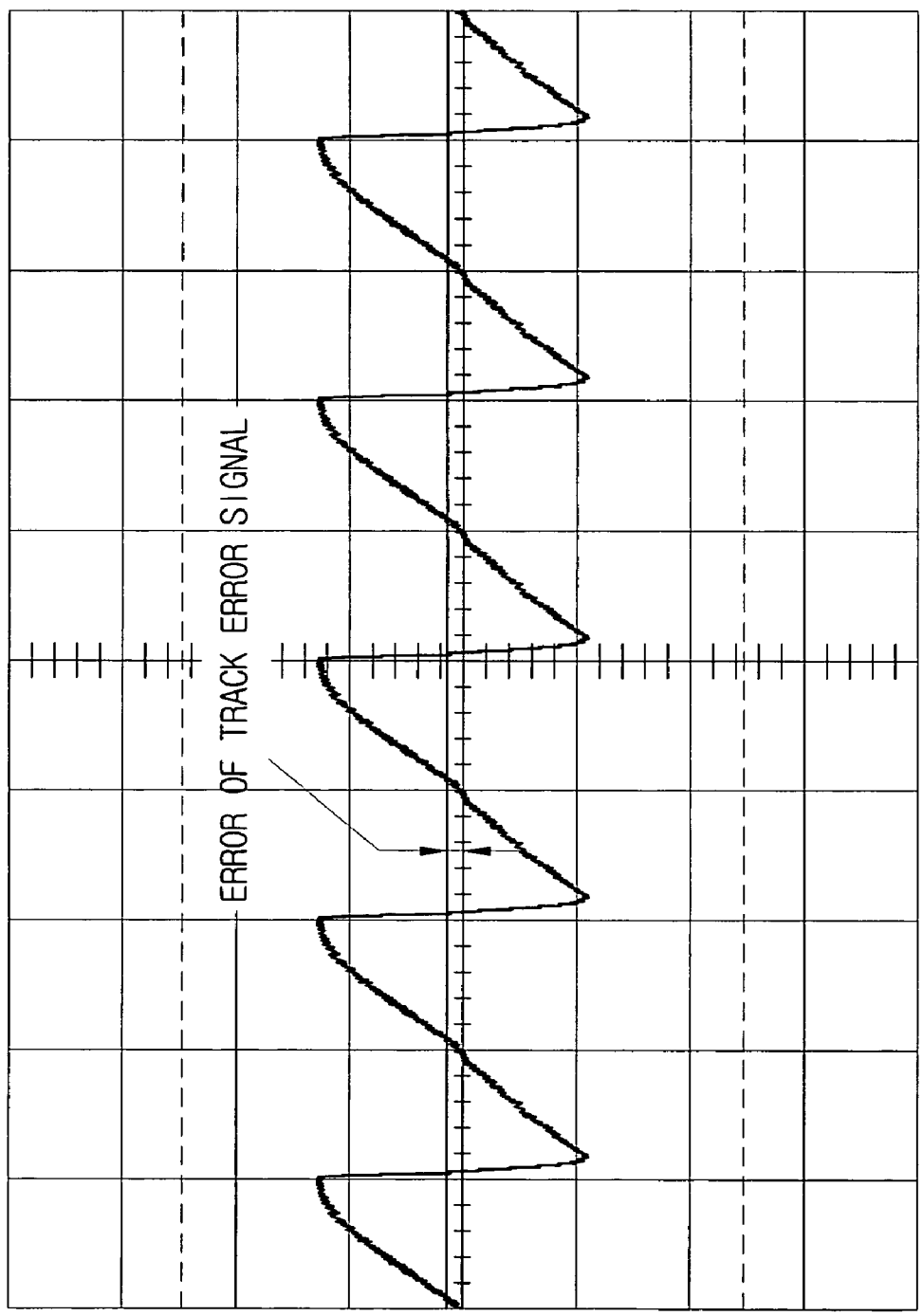
FIGS. 11A and 11B are views explaining the effect of an exemplary, non-limiting embodiment of the present invention.

FIG. 11A shows a result of a measurement in which the phase offsets between A and B and between C and D are not compensated for, and thus the track error signal has an error due to the phase offsets between A and B and between C and D.

Figure 11B:
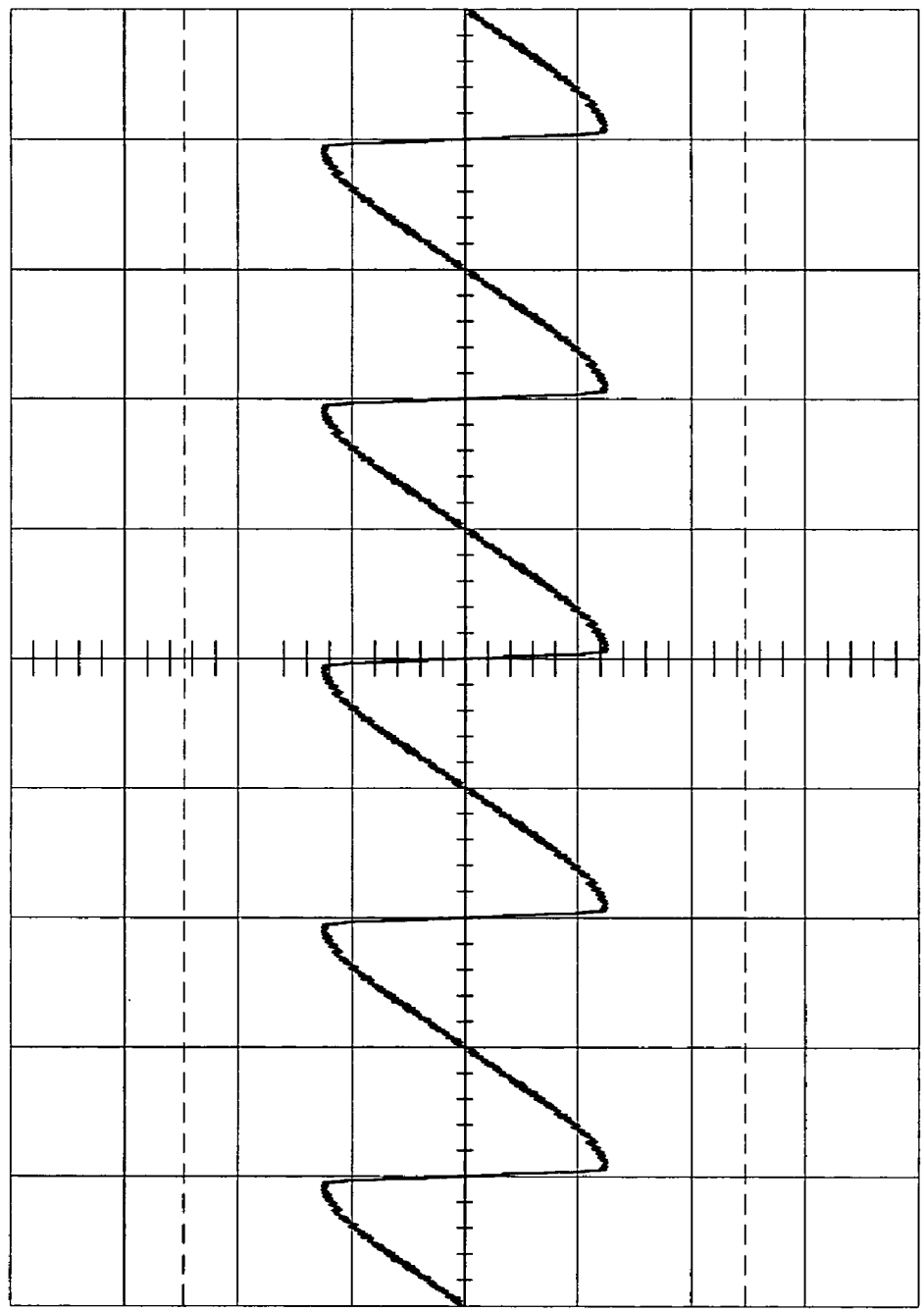

FIG. 11B shows a normal track error signal having no error after the phase offsets between A and B and between C and D are removed by the phase shifting unit 140 according to the present invention.

An exemplary, non-limiting embodiment of the present invention may also be implemented in a computer-readable medium. For example, but not by way of limitation, the computer readable medium may contain a set of instructions for performing the steps described in the foregoing method.

The present invention has various advantages. As described above, according to the present invention, all types of phase offsets which may occur in the DPD type track error detection device can be removed. Thus, the accuracy and reliability of the detected track error signal can be improved.

Also, by adjusting the phases of digital type signals quantized through equalizers and comparators in the process of removing the phase offsets, the power consumption of the system and the size of hardware can be reduced.

While the present invention has been described in detail with reference to the preferred embodiments thereof, it will be apparent to those skilled in the art that various changes, substitutions and alterations can be made hereto without departing from the spirit and scope of the invention as defined by the appended claims.

What is claimed is:

1. A track error detection device including an element for receiving light reflected from a data recording surface of a recording medium, a divided light spot received in the element in tangential and radial directions, and a track error signal detected using signals A, B, C and D that correspond to quantities of light received in respective divided parts, the device comprising:
    an equalizing unit equalizing the inputted signals A, B, C and D to a level;
    a comparison unit quantizing the equalized signals A, B, C and D;
    a phase shifting unit removing phase offsets among the quantized signals A, B, C and D, in accordance with control signals;
    a first control signal for shifting phases of the quantized signals A and C; and
    a second control signal for shifting phases of the quantized signals B and D to the phase shifting unit, wherein the phase shifting unit removes the phase offset between the quantized signals A and B and the phase offset between the quantized signals C and D based on the first and second control signals.

2. The device of claim 1, further comprising a system control unit that generates and outputs the control signals for removing the phase offsets among the quantized signals A, B, C and D to the phase shifting unit.

3. The device of claim 2, wherein the phase shifting unit comprises:
    a first phase shifter shifting the phase of the quantized signal A in accordance with the first control signal;
    a second phase shifter shifting the phase of the quantized signal B in accordance with the second control signal;
    a third phase shifter shifting the phase of the quantized signal C in accordance with the first control signal; and
    a fourth phase shifter shifting the phase of the quantized signal D in accordance with the second control signal.

4. The device of claim 3, wherein the first to fourth phase shifters are VCPS (Voltage Controlled Phase Shifter) circuits that shift the phases in accordance with control voltages.

5. The device of claim 4, wherein the VCPS circuit comprises:
    a first pulse generation unit for comparing a pulse corresponding to an input signal with the control voltage, and selecting a range of the pulse corresponding to the input signal;
    a second pulse generation unit for comparing a pulse corresponding to an inverted input signal with the control voltage, and selecting a range of the pulse corresponding to the inverted input signal; and
    a flip-flop for receiving output signals of each of the first and second pulse generation units as a reset signal and a set signal, respectively.

6. The device of claim 5, wherein the first pulse generation unit comprises:
    a first NMOS transistor, the gate of which receives the input signal, the source of which is grounded, and the drain of which forms a first output terminal;
    a first capacitor coupled between the first output terminal and the source of the first NMOS transistor;
    a first current control unit controlling a current supplied to the first capacitor coupled to the first output terminal of the first NMOS transistor; and
    a first comparison unit comparing a voltage charged in the first capacitor with the control voltage, and selecting the specified range of the pulse corresponding to the charged voltage.

7. The device of claim 5, wherein the second pulse generation unit comprises:
    a second NMOS transistor, the gate of which receives the input signal, the source of which is grounded, and the drain of which forms a second output terminal;
    a second capacitor coupled between the second output terminal and the source of the second NMOS transistor;
    a second current control unit for controlling a current supplied to the second capacitor coupled to the second output terminal of the second NMOS transistor; and
    a second comparison unit for comparing a voltage charged in the second capacitor with the control voltage, and selecting the specified range of the pulse corresponding to the charged voltage.

8. The device of claim 7, wherein the first current control unit and the second current control unit control the current supplied to the respective first capacitor and the second capacitor so that the first and second capacitors have a constant drop rate for charging from a ground voltage level to a power supply voltage level.

9. A phase offset removing method for a track error detection device having an element for receiving light reflected from a data recording surface of a recording medium, a divided light spot that is received in the light receiving element in tangential and radial directions, and a track error signal that is detected via signals A, B, C and D that correspond to quantities of light received in respective divided parts, the method comprising:
    equalizing the inputted signals A, B, C and D to a level;
    quantizing the equalized signals A, B, C and D;
    adjusting phases of the quantized signals A, B, C and D based on control signals, to remove phase offsets among the quantized signals A, B, C and D; and
    a control step of providing the control signals for removing the phase offsets among the quantized signals A, B, C and D, wherein the control step provides a first control signal for shifting phases of the quantized signals A and C, and a second control signal for shifting phases of the quantized signals B and D, to the phase offset removing step; and wherein the phase offset removing step removes the phase offset between the quantized signals A and B, and the phase offset between the quantized signals C and D, based on the first control signal and the second control signal.

10. The method of claim 9, wherein the phase offset removing step is performed by:

a first phase shifter shifting the phase of the quantized signal A in accordance with the first control signal;

a second phase shifter shifting the phase of the quantized signal B in accordance with the second control signal;

a third phase shifter shifting the phase of the quantized signal C in accordance with the first control signal; and a fourth phase shifter shifting the phase of the quantized signal D in accordance with the second control signal, wherein the shifting steps remove the phase offsets using VCPS (Voltage Controlled Phase Shifter) circuits for shifting the phases in accordance with the specified control voltages.

11. The method of claim 10, the VCPS circuits performing the steps of:

comparing a pulse corresponding to an input signal with the control voltage, and selecting a range of the pulse corresponding to the input signal;

comparing a pulse corresponding to an inverted input signal with the control voltage, and selecting a range of the pulse corresponding to the inverted input signal; and a flip-flop receiving output signals of each of the first and second pulse generation units as a reset signal and a set signal, respectively.

12. A computer readable medium containing a set of instructions for a track error detection device having an element for receiving light reflected from a data recording surface of a recording medium, a divided light spot that is received in the light receiving element in tangential and radial directions, and a track error signal that is detected via signals A, B, C and D that correspond to quantities of light received in respective divided parts, said instructions comprising:

equalizing the inputted signals A, B, C and D to a level;

quantizing the equalized signals A, B, C and D;

adjusting phases of the quantized signals A, B, C and D based on control signals, to remove phase offsets among the quantized signals A, B, C and D; and providing a first control signal for shifting phases of the quantized signals A and C and a second control signal for shifting phases of the quantized signals B and D, to the phase offset removing step, wherein the phase offset removing step removes the phase offset between the quantized signals A and B, and the phase offset between the quantized signals C and D, based on the first control signal and the second control signal.

13. The computer readable medium of claim 12, said instructions further comprising providing the control signals for removing the phase offsets among the quantized signals A, B, C and D.

14. The computer readable medium of claim 13, wherein the phase offset removing instruction is performed by:

a first phase shifter shifting the phase of the quantized signal A in accordance with the first control signal;

a second phase shifter shifting the phase of the quantized signal B in accordance with the second control signal;

a third phase shifter shifting the phase of the quantized signal C in accordance with the first control signal; and a fourth phase shifter shifting the phase of the quantized signal D in accordance with the second control signal, wherein the shifting steps remove the phase offsets using VCPS (Voltage Controlled Phase Shifter) circuits in said computer readable medium, for shifting the phases in accordance with the specified control voltages.

15. The computer readable medium of claim 14, the VCPS circuits performing the following instructions in said computer readable medium:

comparing a pulse corresponding to an input signal with the control voltage, and selecting a range of the pulse corresponding to the input signal;

comparing a pulse corresponding to an inverted input signal with the control voltage, and selecting a range of the pulse corresponding to the inverted input signal; and a flip-flop receiving output signals of each of the first and second pulse generation units as a reset signal and a set signal, respectively.

* * * * *